N. F. TURNER.
Ball-Target.
No. 205,220. Patented June 25, 1878.
Fig. 1
Fig. 2.
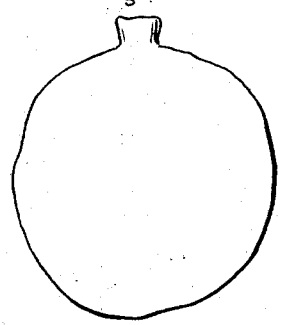
Fig. 3
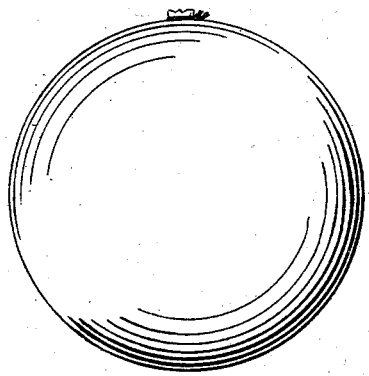
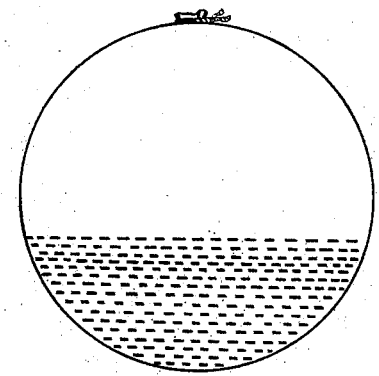
Fig. 4
Witnesses
Geo. H. Mellen
W. T. Thompson
Inventor
Nathan F. Turner

UNITED STATES PATENT OFFICE.

NATHAN F. TURNER, OF BROOKLYN, ASSIGNOR OF ONE-HALF HIS RIGHT TO GEORGE H. MELLEN, OF NEW YORK, N. Y.

IMPROVEMENT IN BALL-TARGETS.

Specification forming part of Letters Patent No. 205,220, dated June 25, 1878; application filed May 29, 1878.

*To all whom it may concern:*

Be it known that I, NATHAN F. TURNER, of the city of Brooklyn, Kings county, State of New York, have invented a new and useful Improvement in Target-Balls, of which the following is a specification:

In the accompanying drawings, Figures 1 and 2 are edge and side views of the elastic bag before being inflated. Fig. 3 represents the ball when finished. Fig. 4 is a sectional view of the ball, showing the material introduced to give weight to the same.

This invention relates to a ball made in such a manner of elastic material, and inflated or stretched by the introduction of either air, gas, or liquid or solid matter, that, when thrown into the air as a target to shoot at, on being hit by a shot, if ever so slightly, will burst or collapse, thereby showing to a certainty when it is hit.

Heretofore target-balls have been principally made of glass, plaster, or other like hard and brittle substances, such brittleness being thought necessary to insure their breaking upon being struck by a shot, and much time and labor have been expended in experimenting to obtain the hardest and most brittle substance for the purpose.

The target-balls heretofore made are objectionable on several accounts, and in various ways defective, inasmuch as when fairly hit with shot they do not always break, the shot sometimes chipping out a very small piece of the ball, leaving the remainder unbroken.

Balls made of plaster or cement are especially liable to have a number of shot pass through them without shattering them.

Another disadvantage with glass, plaster, or other balls made of like brittle substance is that when thrown into the air they frequently break, when thrown from the trap, from shock; or, if not broken by the trap and are missed by the shooter, they frequently break from impact with the ground on falling, thereby entailing as much expense for the balls not hit as for those that are hit, which is quite an important item.

Another very objectionable feature of the glass ball is that on breaking them when shooting the broken glass remains on the ground for a long time, making it dangerous both for man or beast to walk over the ground where they have been broken.

Plaster or cement balls are also objectionable on account of deterioration of their brittleness or breaking qualities by their absorption of moisture in damp weather, they not breaking as readily on a damp day as on a dry day.

In my improved elastic target-ball all the objections to all other target-balls are entirely overcome. Its advantages may be enumerated as follows: My elastic target-ball will instantly break or collapse every time on being hit at any point, even by a single shot, thereby preventing all doubt as to whether it is hit by the shot or not; the trap will not break them when sprung; they will not break on striking the ground if not hit by the shot; they leave nothing objectionable on the ground when broken or collapsed; are easily and cheaply made; and are not liable to damage in transportation.

To enable others skilled in the art to which my invention relates to make the same, I will proceed to describe the process.

To make my elastic target-ball I use rubber or any elastic substance that is suitable to inflate or stretch.

Having prepared a small bag made of the above-mentioned elastic material of the proper size and shape, said bag preferably having a small neck or projection, I expand it by filling it with air, gas, water, or any other suitable material or substance, until it is of the proper size and form, using at the same time any material to give it the proper weight to facilitate throwing it into the air, after which the neck is tightly closed by tying with a string or otherwise, the ball being now ready for use.

Having thus fully described my invention, what I claim as new, and desire to secure by Letters Patent, is—

An elastic target-ball made of rubber or other suitable elastic material, inflated or expanded and weighted, as set forth, and for the purpose specified.

NATHAN F. TURNER.

Witnesses:
 GEO. H. MELLEN,
 JNO. S. THOMPSON.